US008719228B1

(12) United States Patent
Venkatesan

(10) Patent No.: US 8,719,228 B1
(45) Date of Patent: *May 6, 2014

(54) METHOD AND SYSTEM FOR IDENTIFYING OBSOLETE DISCUSSION THREADS IN A FORUM

(71) Applicant: Arun Venkatesan, SunnyVale, CA (US)

(72) Inventor: Arun Venkatesan, SunnyVale, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/756,016

(22) Filed: Jan. 31, 2013

Related U.S. Application Data

(63) Continuation of application No. 12/415,925, filed on Mar. 31, 2009, now Pat. No. 8,412,679.

(51) Int. Cl.
*G06F 7/00* (2006.01)
(52) U.S. Cl.
USPC .............................. 707/640; 707/608; 707/708
(58) Field of Classification Search
None
See application file for complete search history.

(56) References Cited

U.S. PATENT DOCUMENTS

| | | | |
|---|---|---|---|
| 6,516,337 B1 | 2/2003 | Tripp et al. | |
| 7,315,826 B1 | 1/2008 | Guheen et al. | |
| 7,444,358 B2 | 10/2008 | Paczkowski et al. | |
| 7,461,043 B2 | 12/2008 | Hess | |
| 7,801,845 B1 * | 9/2010 | King et al. | 707/608 |
| 7,840,576 B1 * | 11/2010 | Siegel et al. | 707/755 |
| 7,970,781 B1 | 6/2011 | King et al. | |
| 2002/0052919 A1 * | 5/2002 | Morris et al. | 709/205 |
| 2004/0230572 A1 | 11/2004 | Omoigui | |
| 2006/0041550 A1 * | 2/2006 | Bennett et al. | 707/5 |
| 2008/0168135 A1 * | 7/2008 | Redlich et al. | 709/204 |
| 2009/0150827 A1 * | 6/2009 | Meyer et al. | 715/810 |
| 2010/0010968 A1 | 1/2010 | Redlich et al. | |
| 2010/0070448 A1 | 3/2010 | Omoigui | |
| 2010/0192055 A1 * | 7/2010 | Shaked et al. | 715/234 |
| 2010/0242028 A1 | 9/2010 | Weigert | |

OTHER PUBLICATIONS

Stadler, L., "Lazy Continuations for Java Virtual Machines", PPPJ '09, ACM, Aug. 27-28, 2009, 10 pages.
Gorres, T., "Identification and Extraction of Forum Contribution Types", ACM, Jul. 29, 2010, 43 pages.
Overbey, J. L., Johnson, R. E., "Regrowing a Language", OOPSLA 2009, Oct. 25-29, 2009, 10 pages.

* cited by examiner

*Primary Examiner* — Matt Kim
*Assistant Examiner* — Hua Lu
(74) *Attorney, Agent, or Firm* — Osha Liang LLP

(57) ABSTRACT

The invention relates to a method for identifying obsolete discussion threads. The method includes extracting keywords from a discussion thread and assigning a keyword score to each keyword. The method further includes identifying a change event that is a change affecting a topic of the forum, extracting a keyword from a recorded medium recording the change event, comparing the keyword from the recorded medium with the keywords from the discussion thread to identify a matching keyword, and reducing the keyword score of the matching keyword to a reduced score based on the matching keyword matching the keyword from the recorded medium. The method further includes aggregating the keyword score assigned to each keyword to obtain a total score for the discussion thread, and displaying a warning on a user interface that includes the discussion thread when the total score is below a pre-specified threshold.

20 Claims, 6 Drawing Sheets

METHOD AND SYSTEM FOR IDENTIFYING OBSOLETE DISCUSSION THREADS IN A FORUM

CROSS-REFERENCE TO RELATED APPLICATIONS

This application is a continuation application of U.S. patent application Ser. No. 12/415,925, filed Mar. 31, 2009, and entitled "METHOD AND SYSTEM FOR IDENTIFYING OBSOLETE DISCUSSION THREADS IN A FORUM". Accordingly, this application claims benefit of U.S. patent application Ser. No. 12/415,925 under 35 U.S.C. §120. U.S. patent application Ser. No. 12/415,925 is hereby incorporated by reference in its entirety.

BACKGROUND

Various tasks performed in life (e.g., using software, interfacing with a government agency, using an electronic device, creating an agreement between individuals and business entities, and other tasks) can cause confusion to users. In efforts to simplify the tasks, documents (e.g., books, help files, tutorials, and other such documents) are released to provide an explanation of how to perform the tasks. The documents may include a frequently asked question section, a trouble shooting section, an example section, and a detailed description. Thus, the document provides guidance to the users to perform various tasks related to the law, regulation, software release, or other event.

In addition to documents, users create Internet communities. The Internet based communities allow the users to assist each other. Namely, the Internet connects users to other users that may have the same dilemma. Often users are connected via a forum. A forum is a centralized website on the Internet. Typically, a forum is directed to a particular topic. For example, a forum may be directed to filing a tax return, use of an application or device, programming in a specific programming language, and other topics for discussion.

In general, when a user wants to discuss a topic, the user creates a discussion thread by posting a question on the forum. Other users perusing the forum may provide a response to the question by adding comments or answers to the discussion thread. Thus, the user that posts the question is able to receive an answer to the user's exact question. Moreover, other users who have the same question may view the discussion thread to view the answers and comments provided by the community. Thus, the community assists users in answering a variety of questions about a topic.

SUMMARY

In general, in one aspect, the invention relates to a method for identifying obsolete discussion threads. The method includes extracting a plurality of keywords from a discussion thread and assigning a keyword score to each of the plurality of keywords. The method further includes identifying a change event that is a change affecting a topic of the forum, extracting a keyword from a recorded medium recording the change event, comparing the keyword from the recorded medium with the plurality of keywords from the discussion thread to identify a matching keyword in the plurality of keywords, and reducing the keyword score of the matching keyword to a reduced score based on the matching keyword matching the keyword from the recorded medium. The method further includes aggregating the keyword score assigned to each of the plurality of keywords to obtain a total score for the discussion thread. Aggregating includes using the reduced score for the matching keyword. The method further includes displaying a warning on a user interface that includes the discussion thread when the total score is below a first pre-specified threshold.

In general, in one aspect, the invention relates to a computer system for identifying obsolete discussion threads in a forum. The computer system includes a processor, a memory, and software instructions stored in memory. The software instructions cause the computer system to extract a plurality of keywords from a discussion thread and assign a keyword score to each of the plurality of keywords. The software instructions further cause the computer system to identify a change event that is a change affecting a topic of the forum, extract a keyword from a recorded medium recording the change event, compare the keyword from the recorded medium with the plurality of keywords from the discussion thread to identify a matching keyword in the plurality of keywords, and reduce the keyword score of the matching keyword to a reduced score based on the matching keyword matching the keyword from the recorded medium. The software instructions further cause the computer system to aggregate the keyword score assigned to each of the plurality of keywords to obtain a total score for the discussion thread. Aggregating includes using the reduced score for the matching keyword. The software instructions further cause the computer system to display a warning on a user interface that includes the discussion thread when the total score is below a first pre-specified threshold.

In general, in one aspect, the invention relates to a computer readable storage medium that includes computer readable program code embodied therein for causing a computer system to extract a plurality of keywords from a discussion thread and assign a keyword score to each of the plurality of keywords. The computer readable program code further cause the computer system to identify a change event that is a change affecting a topic of the forum, extract a keyword from a recorded medium recording the change event, compare the keyword from the recorded medium with the plurality of keywords from the discussion thread to identify a matching keyword in the plurality of keywords, and reduce the keyword score of the matching keyword to a reduced score based on the matching keyword matching the keyword from the recorded medium. The computer readable program code further cause the computer system to aggregate the keyword score assigned to each of the plurality of keywords to obtain a total score for the discussion thread. Aggregating includes using the reduced score for the matching keyword. The computer readable program code further cause the computer system to display a warning on a user interface that includes the discussion thread when the total score is below a first pre-specified threshold.

Other aspects of the invention will be apparent from the following description and the appended claims.

DETAILED DESCRIPTION

Figure 1:
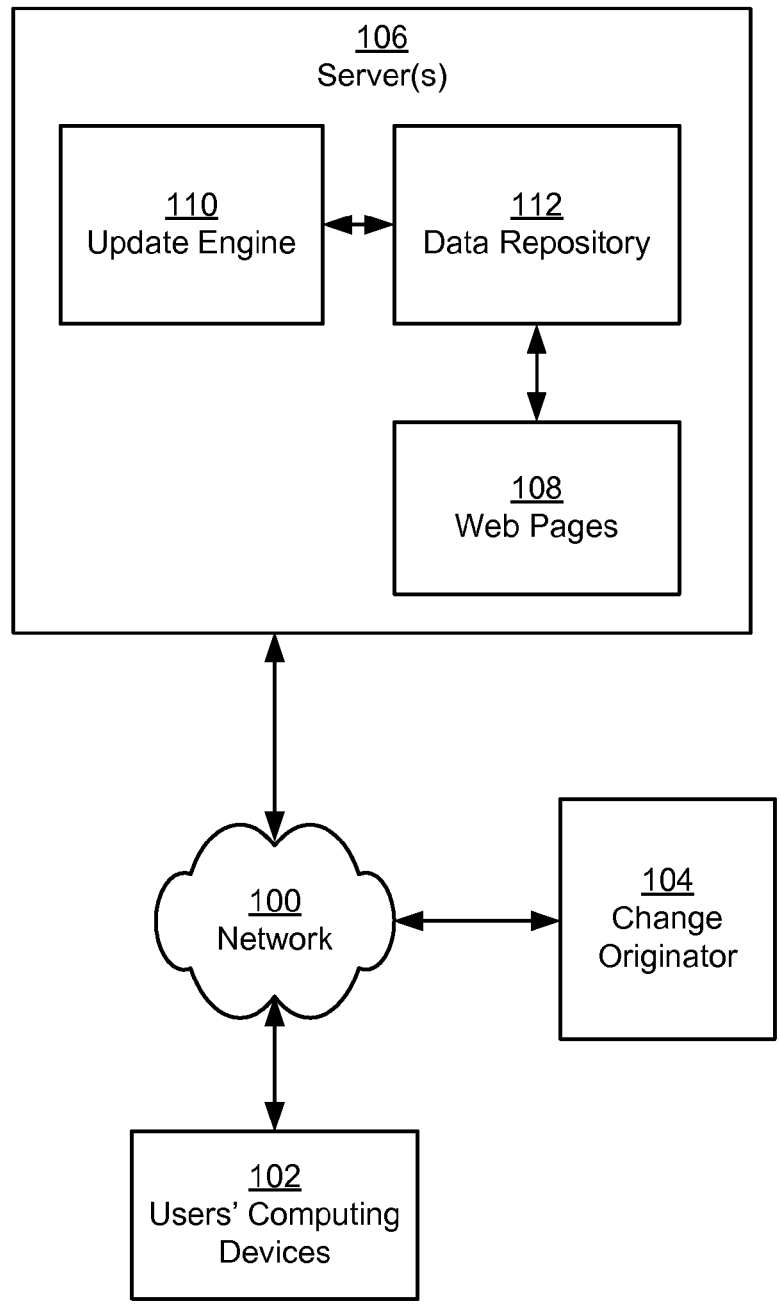
FIGS. 1 and 2 show schematic diagrams of a system in accordance with one or more embodiments of the invention.

Specific embodiments of the invention will now be described in detail with reference to the accompanying figures. Like elements in the various figures are denoted by like reference numerals for consistency. Further, the use of "Fig." in the drawings is equivalent to the use of the term "Figure" in the description.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for updating forums. In one or more embodiments of the invention, a forum is an online location in which users share information. Thus, a forum provides a centralized location in which a community of users may share information about a specific topic. For example, the topic of the forum may be about a specific software product or class of software products, preparing taxes, performing accounting tasks, performing tasks related to specific government agencies, performing a class of tasks governed by law, etc. Specifically, a forum allows users to post and retrieve content. In one or more embodiments of the invention, the forum is organized into discussion threads. A discussion thread is a series of postings in which users respond to each other. For example, one user may post a question about the topic of the forum, thereby initialing the discussion thread. Another user may post a response in the form of a comment or an answer to the question. Other users may continue to respond to the original user or any other user that has posted to the discussion thread.

Embodiments of the invention assist in ensuring that discussion threads in the forum are current and not obsolete. Obsolete discussion threads may be those in which the basis of advice in posts on the discussion thread has changed. For example, a discussion thread about patents may be obsolete with the release of a new patent statute. Specifically, embodiments of the invention assign an initial keyword score to each new discussion thread in the forum. When a change event occurs that may affect the discussion threads in the forum, embodiments of the invention identify discussion threads that may be affected by the change event and alters the keyword score assigned to the affected discussion threads to indicate that the discussion thread may be outdated. When the keyword score assigned to a discussion thread exceed a threshold number, then the discussion thread may be considered outdated. Outdated discussion threads may be marked as outdated or removed from the forum, thereby updating the forum.

Figure 2:
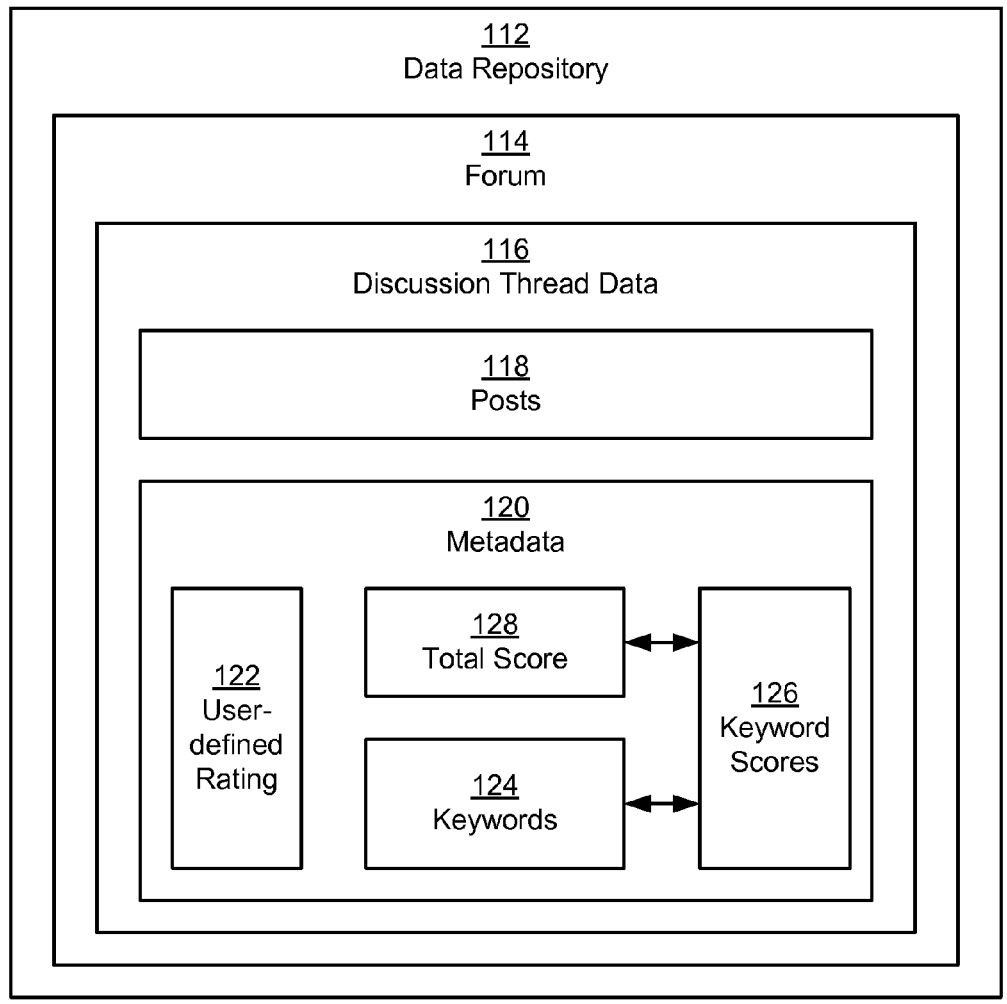

FIGS. 1 and 2 show schematic diagrams of a system in accordance with one or more embodiments of the invention. Specifically, FIG. 1 shows a schematic diagram for identifying outdated discussions threads and updating forums in accordance with one or more embodiments of the invention.

As shown in FIG. 1, the system includes a network (100), users' computing devices (102), a change originator (104), and server(s) (106) in accordance with one or more embodiments of the invention. Each of these components is described below.

In one or more embodiments of the invention, the network (100) is any type of interconnection of computer systems. For example, the network (100) may be a local area network, a wide area network (e.g., the Internet), or a combination thereof. In one or more embodiments of the invention, users' computing devices (102) are connected to the network (100). The users' computing devices (102) are network enabled devices used by at least one user that include functionality to interface with the forum and at least one user of the forum. For example, the users' computing devices (102) may include personal computers, mobile devices, network enabled gaming consoles, and other types of network enabled devices.

In one or more embodiments of the invention, the change originator (104) corresponds to an entity that may issue changes affecting the forum. For example, the change originator may include a regulatory agency (e.g., the internal revenue service, the United States Patent and Trademark Office, a foreign patent and trademark office, etc.), a judge, a software company, or any other entity that may issue a change affecting the topic of the forum. For example, the change originator (104) may include functionality to issue change events. A change event is a change that affects one or more discussion threads in the forum. For example, a change event may be a new regulation, a new statute, a software release, a court decision, etc. In one or more embodiments of the invention, change events are recorded on a recorded medium. For example, the change event may be recorded in a file, in a federal register, on a web page, as part of a help document, etc.

In one or more embodiments of the invention, the server(s) (106) is a computing device that includes functionality to receive and process requests from users' computing devices (102). The server(s) (106) may include multiple servers, such as application servers, identity servers, and other types of servers. In one or more embodiments of the invention, the server(s) (106) includes web pages (108), update engine (110), and a data repository (112). Each of these components is discussed below.

In one or more embodiments of the invention, the web pages (108) include software instructions for hosting the forum. In one or more embodiments of the invention, the update engine (110) includes functionality to update the forum. Specifically, the update engine (110) includes functionality to process change events and update the forum. Processing change events is discussed below and in FIG. 4. In one or more embodiments of the invention, the web pages (108) and the update engine (110) are connected to a data repository (112).

In one or more embodiments of the invention, the data repository (112) is any type of storage unit and/or device (e.g., a file system, database, collection of tables, or any other storage mechanism) for storing data. Further, the data repository (112) may include multiple different storage units and/or devices. The multiple different storage units and/or devices may or may not be of the same type or located at the same physical site. The data repository (112) is discussed below and in FIG. 2.

FIG. 2 shows a schematic diagram of the data repository (112) in accordance with one or more embodiments of the invention. Specifically, FIG. 2 shows data that may be stored in the data repository (112) in accordance with one or more embodiments of the invention. In one or more embodiments of the invention, the data repository (112) stores data for at least one forum (114). The forum (114) includes discussion thread data (116) for discussion threads in the forum. Although FIG. 2 shows a single discussion thread, the forum (114) includes multiple discussion threads. For example, the forum (114) may include hundreds of discussion threads.

In one or more embodiments of the invention, the discussion thread data (116) for a discussion thread includes one or more posts (118) and metadata (120). In one or more embodiments of the invention, the posts (118) include data displayed in the web pages of the forum. For example, the posts (118) may include an initial question, comments, follow-up questions, answers, and other such information.

In one or more embodiments of the invention, the metadata (120) include information about the posts (118). In one or more embodiments of the invention, the metadata (120) includes user-defined rating (122), keywords (124), a keyword score for each keyword (126), and a total score (128). Each of these is discussed below.

In one or more embodiments of the invention, the user-defined rating (122) is a rating defined by users of the forum (114). Specifically, users of the forum (114) may review the posts (118) of the discussion thread and rate the discussion thread. For example, the user defined rating may be a numeric value that defines how much the content of the discussion thread is useful or correct to the user. The user-defined rating may correspond to the average of the ratings provided by each user.

The keywords (124) include a normalized list of words in the discussion thread. In one or more embodiments of the invention, the normalized list excludes multiple entries of the same word, articles, and non-descriptive terms. For example, the keywords (124) may include specific statute or regulation identifiers, words in a menu, and other words that provide information about the subject of the discussion thread. In one or more embodiments of the invention, the keywords (124) may include key phrases (e.g., "35 U.S.C. §101"). In such embodiments, a keyword may include spacing between letters of the keywords or may include a multiple words.

In one or more embodiments of the invention, each keyword (124) in the discussion thread has a corresponding keyword score (126). In one or more embodiments of the invention, a keyword score is a numeric value. In one or more embodiments of the invention, the initial keyword score assigned to the keyword (124) is a normalized score dependent on the number of keywords in the discussion thread. The keyword score in the discussion thread is changed when the keyword is identified in a change event. In one or more embodiments of the invention, the aggregate of the keyword scores (126) of the keywords (124) in the discussion thread provides a total score (128) for the discussion thread. Because the keyword score is updated when a change event occurs, the keyword score defines how likely the discussion thread is to be obsolete. In one or more embodiments of the invention, a lower keyword score indicates that the discussion thread is more likely to be obsolete. However, an equivalent technique is to assign keyword scores such that a higher score indicates the discussion thread more likely obsolete. Assigning and updating keyword scores for the discussion thread is discussed below.

Figure 3:
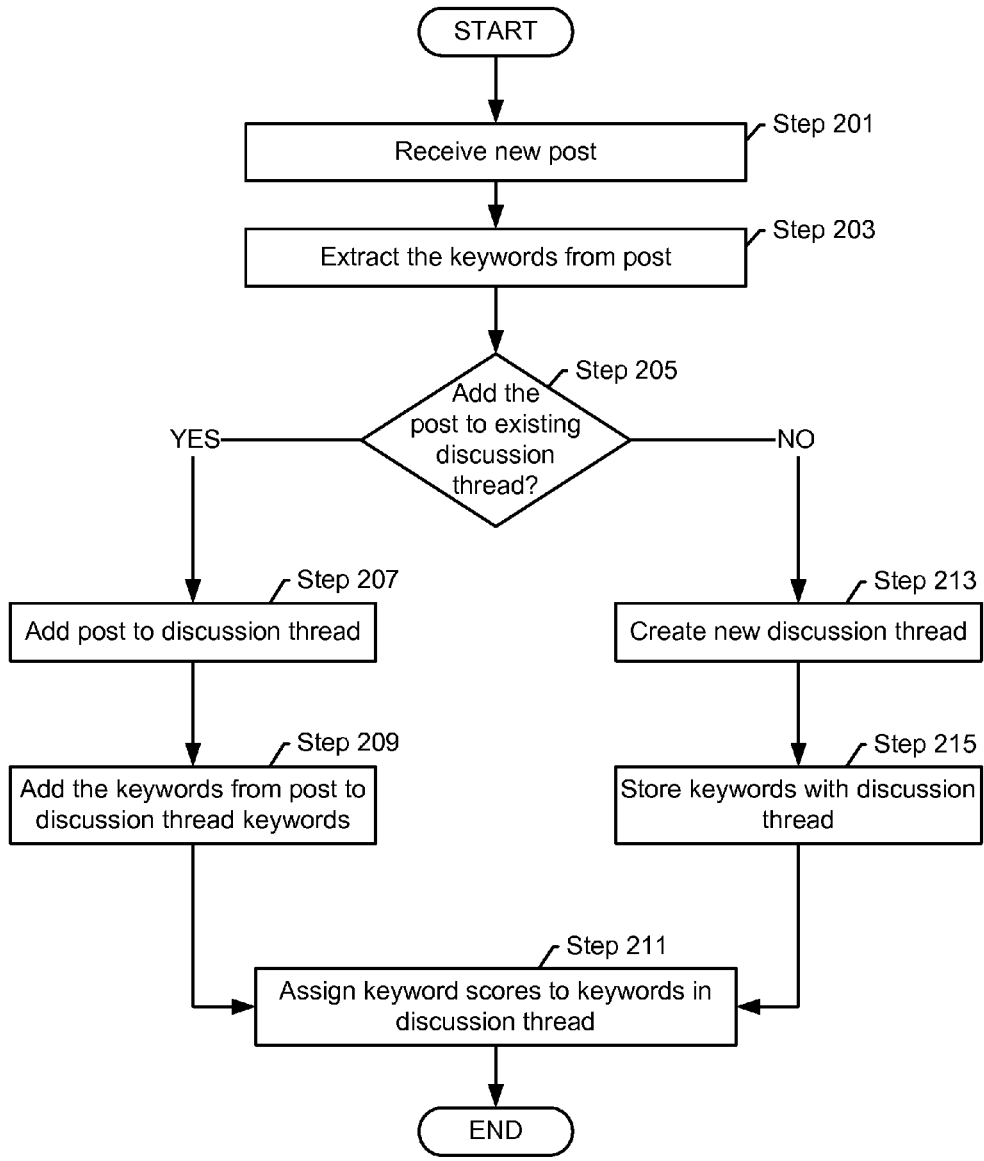
FIGS. 3-5 show flowcharts in accordance with one or more embodiments of the invention.
Figure 4:
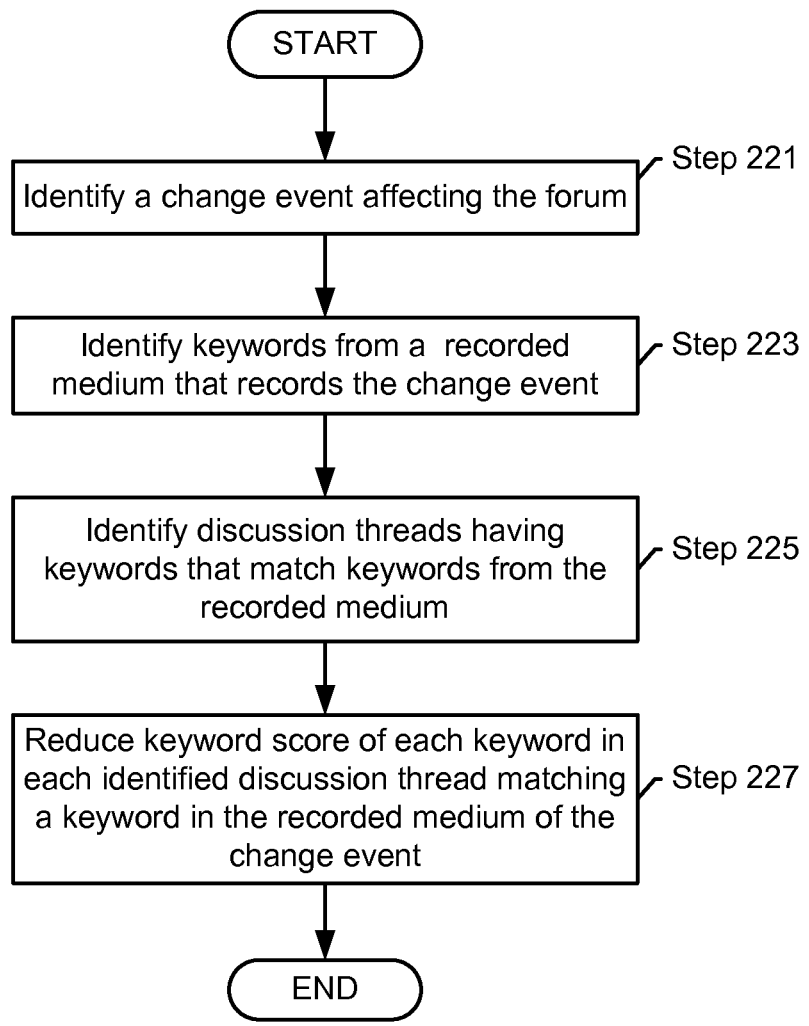
Figure 5:
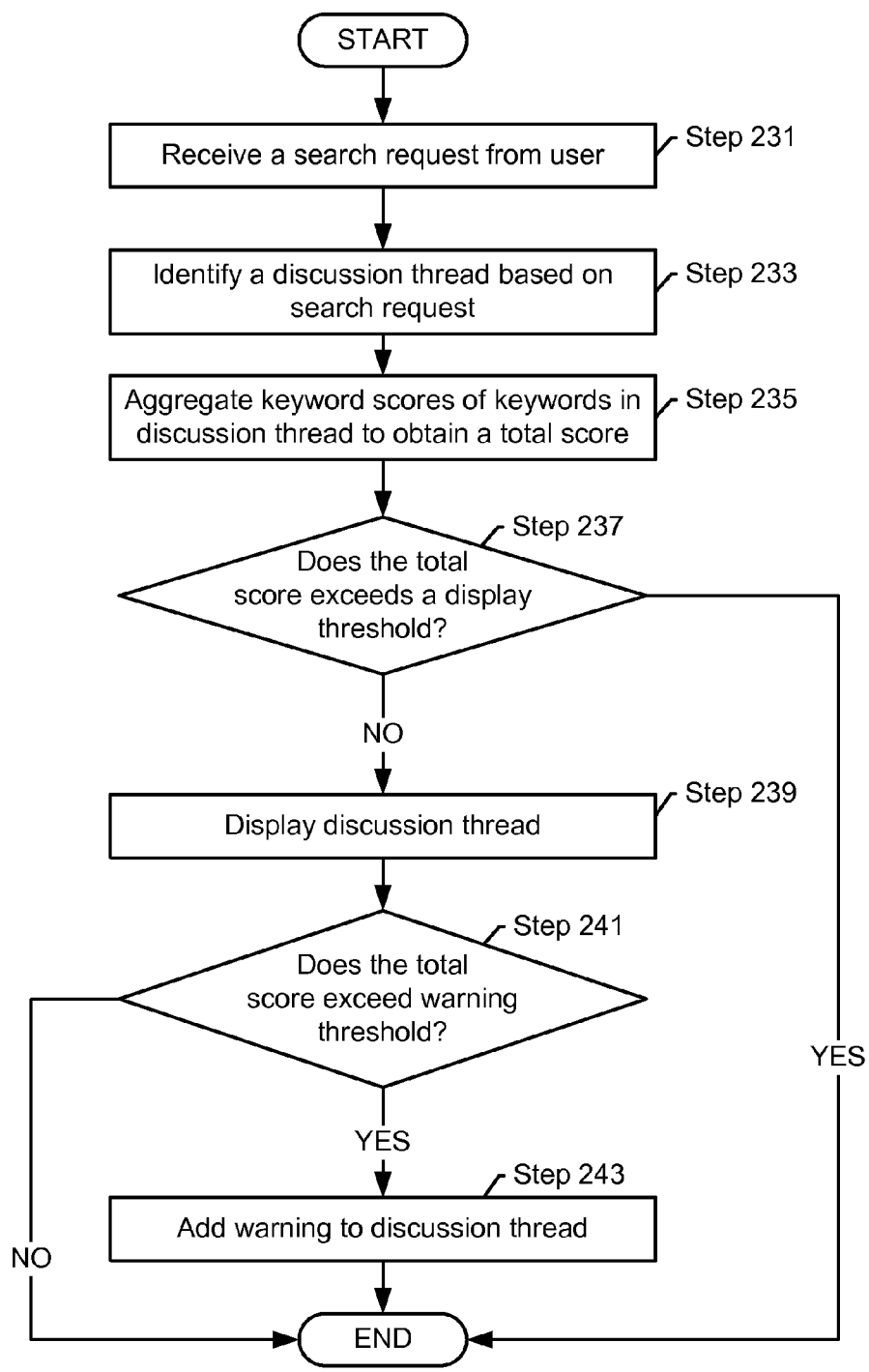

FIGS. 3-5 show flowcharts in accordance with one or more embodiments of the invention. While the various steps in this flowchart are presented and described sequentially, one of ordinary skill will appreciate that some or all of the steps may be executed in different orders, may be combined or omitted, and some or all of the steps may be executed in parallel. In addition, steps such as store acknowledgements have been omitted to simplify the presentation.

FIG. 3 shows a flowchart for receiving a new post in accordance with one or more embodiments of the invention. In Step 201, a new post is received in accordance with one or more embodiments of the invention. Receiving a new post may be based, for example, on a user perusing the forum. The user may select an input box to add a comment, response, or pose a question to an existing discussion thread while perusing the forum. Alternatively, the user may select an input box to initiate a new discussion thread. For example, the user may have a question or a topic of discussion not previously introduced in another discussion thread. In either scenario, the user may submit the new post in an input field, in an email, etc. to the forum. When the new post is received, in one or more embodiments of the invention, the new post is processed as follows.

In Step 203, the keywords are extracted from the post in accordance with one or more embodiments of the invention. In one or more embodiments of the invention, the keywords that are extracted are normalized. Specifically, the post is divided into keywords. Further, articles, personal pronouns, and other such filler words may be removed. Identifying keywords may be performed, for example, by comparing the words in the post with a dictionary of terms. The dictionary of terms may include terms to include or exclude from the list of keywords. Additionally, the keywords may be normalized to the root of each keyword. For example, the words "immigrant", "immigration", "immigrating", "immigrates" may be normalized to "immigrate". In one or more embodiments of the invention, the keywords are extracted such that only a single instance of a keyword is in the set of keywords extracted.

In Step 205, a determination is made whether to add the post to an existing discussion thread in accordance with one or more embodiments of the invention. In Step 207, if a determination is made to add the post to the existing discussion thread, then the post is added to the discussion thread in accordance with one or more embodiments of the invention. Specifically, the discussion thread is updated to reflect the additional posting.

In Step 209, the keywords from the post are added to the discussion thread keywords in accordance with one or more embodiments of the invention. In one or more embodiments of the invention, only the keywords that are not already in the discussion thread are added to the list of keywords.

In Step 211, keyword scores are assigned to keywords in the discussion thread in accordance with one or more embodiments of the invention. In one or more embodiments of the invention, the keyword scores of previously existing keywords and new keywords are normalized. In one or more embodiments of the invention, normalizing the keyword score is performed by identifying the current total of the keyword scores in the discussion thread. Specifically, the current total may be calculating by aggregating or summing the keyword scores of the keywords in the discussion thread. Further, a total number of keywords, including newly added keywords, in the discussion thread are identified. The current total score for the discussion thread is divided by the total number of keywords results to obtain an average keyword score. The average keyword score may be assigned to each keyword in the discussion thread, including the newly added keywords.

For example, consider the scenario in which the discussion thread had the keywords, "charity" with a keyword score of five, "contribution" with a keyword score of five, and "tax deductible" with a keyword score of two. In the example, a new post adds the keyword "car" to the above set of keywords. Accordingly, in the example, the total score for the example discussion thread is twelve and four keywords exist in the discussion thread. Each keyword in the discussion thread may, therefore, be assigned a keyword score of three.

Continuing with FIG. 3, if a determination is made not to add the post to an existing discussion thread, then the determination may be made to add the post to a new discussion thread. In Step 213, a new discussion thread is created in accordance with one or more embodiments of the invention. Creating the new post may be performed using techniques known in the art.

In Step 215, keywords from the post are stored with the discussion thread in accordance with one or more embodiments of the invention. Specifically, the discussion thread is associated with the set of keywords extracted from the post.

In Step 211, a keyword score is assigned to each keyword in the discussion thread in accordance with one or more embodiments of the invention. In one or more embodiments of the invention, for a new discussion thread, an initial keyword score is assigned to the keywords. The initial keyword score is a normalized keyword score for the discussion thread is based on an initial default total score for the discussion thread in accordance with one or more embodiments of the invention. An initial default total score is a pre-defined score that is assigned to each new discussion thread. The default total score may be divided by the number of keywords in the post to identify the normalized keyword score for each keyword. Accordingly, the new discussion thread and the keyword score for each keyword may be stored in the data repository.

FIG. 4 shows a flowchart for updating the forum when a change event occurs that affects the forum. In Step 221, a change event affecting the forum is identified. Identifying a change event may be performed by monitoring change originators. For example, courts may be monitored for the addition of new opinion, regulatory agencies may be monitored for new regulations or administrative decisions, legislature may be monitored for new statutes, software companies may be monitored for new versions of software, and other change originators may be monitored. The monitoring of the change originators may be performed, for example, by an administrator of the forum, by users of the forum, or by automated software. For example, automated software may be configured to scan websites of the change originators for change events. When a change event is detected, the forum may be updated to reflect the change event.

In Step 223, keywords from a recorded medium that records the change event are identified. Identifying the keywords may include extracting the keywords from the recorded medium and normalizing the keywords. Extracting and normalizing the keywords may be performed, for example, as discussed above concerning extracting keywords from posts.

In Step 225, the discussion threads having keywords that match the keywords from the recorded medium are identified. Different methods may be used to identify the discussion threads. For example, each discussion thread may be accessed and the keywords identified. Next, a comparison between the identified keywords and the keywords from the recorded medium may be performed to identify whether the discussion thread has matching keywords. Alternative, a keyword index may be used that identifies keywords to the discussion thread that has the keywords. Thus, the same keyword in the keyword index may identify more than one discussion thread. The discussion thread may have a corresponding keyword score for the keyword in the keyword index.

In Step 227, the keyword score of each keyword in each identified discussion thread matching a keyword in the recorded medium of the change event is reduced. In one or more embodiments of the invention, the keyword score is reduced by a pre-defined amount. In one or more embodiments of the invention, the pre-defined amount is a constant. For example, all keywords that match the keywords in the recorded medium may have a keyword score reduced by "12" regardless of the normalized keyword score for the keyword. In one or more embodiments of the invention, keywords may be assigned negative scores after the reduction. By reducing the keyword scores of the keywords, the discussion threads that have low total scores may be identifies as being potentially outdated.

FIG. 5 shows a flowchart for displaying a discussion thread in accordance with one or more embodiments of the invention. In Step 231, a search request is received from the user in accordance with one or more embodiments of the invention. For example, a user may enter terms in a search field to search the forum for discussion threads matching the terms. In Step 233, a discussion thread is identified based on the search request. Specifically, the data repository may be searched for a discussion thread having the matching terms.

In Step 235, the keyword scores assigned to each of the keywords in the discussion thread are aggregated to obtain the total score in accordance with one or more embodiments of the invention. The total score may be calculated at any time up to when the total score is used. For example, the total score may be stored with the discussion thread and recalculated any time the keyword score of a keyword is reduced in the discussion thread. As another example, the total score may be calculating after a search request is received from a user.

In Step 237, a determination is made whether the total score exceeds a display threshold. If the total score exceeds the display threshold, then the discussion thread is not displayed in accordance with one or more embodiments of the invention. A display threshold specifies a lower limit at which the discussion thread is displayed. Specifically, the discussion thread may be deemed completely outdated if the total score is below the display threshold. In one or more embodiments of the invention, the display threshold is preset by a web page administrator. In one or more embodiments of the invention, the display threshold is preset by the user viewing the discussion threads. For example, each user may set a separate display threshold as part of the user's settings for the forum.

In one or more embodiments of the invention, if the total score exceeds the display threshold, the discussion thread may be purged from the data repository. For example, completely outdated discussion threads as defined by the total score may be deleted from the forum.

In Step 239, the discussion thread is displayed if the total score does not exceed the display threshold in accordance with one or more embodiments of the invention. Specifically, the discussion thread may be displayed in a display device of the computing device of the user.

In Step 241, a determination is made whether the total score exceeds a warning threshold in accordance with one or more embodiments of the invention. In one or more embodiments of the invention, the warning threshold is a higher number than the display threshold. The warning threshold may identify, for example, when users should be warned that the discussion thread is outdated. The warning threshold may be set, as discussed above, in a manner similar to the display threshold.

In Step 243, a warning is added to the discussion thread if the total score exceeds the warning threshold in accordance with one or more embodiments of the invention. Specifically, the warning is displayed in the user interface that show the discussion thread. The warning may indicate to the user that the discussion thread is potentially outdated. In one or more embodiments of the invention, the warning is displayed in a prominent position. For example, the warning may be displayed at the top of the web page showing the discussion thread or in a pop-up box or text box in front of the window displaying the discussion thread. Further, for example, the warning may be displayed in large type or in a different font or color of font than the remaining text of the discussion thread in accordance with one or more embodiments of the invention. Thus, attention is drawn to the warning. By having a warning, the user may be prevented from relying on potentially outdated advice. Thus, the user may determine that discussion threads not having a warning are more accurate. Further, if a warning is displayed, the user may choose to start a new discussion thread with a same or similar question as the previous discussion thread. Thus, the user may receive revised community feedback.

Figure 6:
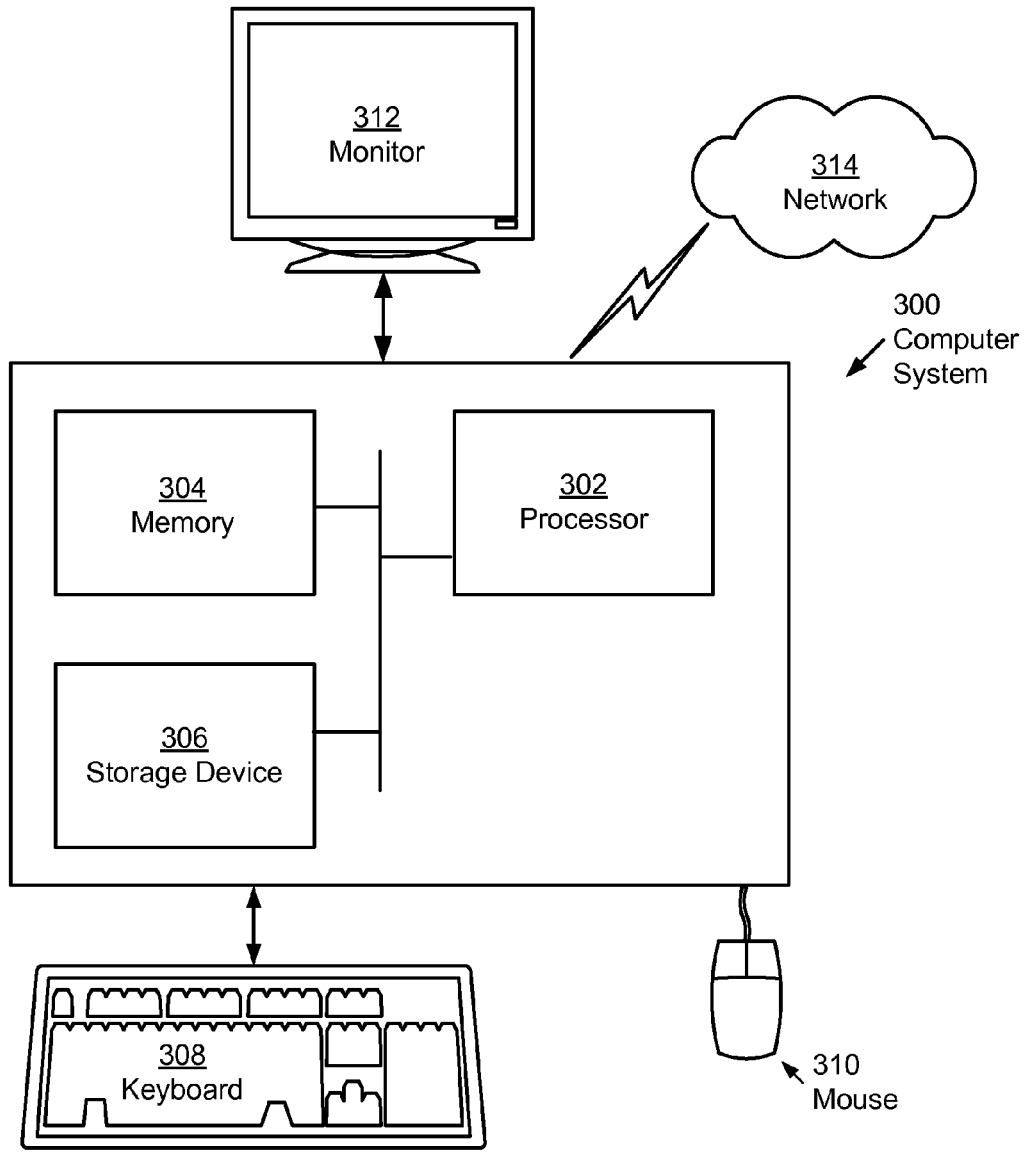
FIG. 6 shows a computer system in accordance with one or more embodiments of the invention.

Embodiments of the invention may be implemented on virtually any type of computer regardless of the platform being used. For example, as shown in FIG. 6, a computer system (300) includes one or more processor(s) (302), associated memory (304) (e.g., random access memory (RAM), cache memory, flash memory, etc.), a storage device (306) (e.g., a hard disk, an optical drive such as a compact disk drive or digital video disk (DVD) drive, a flash memory stick, etc.), and numerous other elements and functionalities typical of today's computers (not shown). The computer (300) may also include input means, such as a keyboard (308), a mouse (310), or a microphone (not shown). Further, the computer (300) may include output means, such as a monitor (312) (e.g., a liquid crystal display (LCD), a plasma display, or cathode ray tube (CRT) monitor). The computer system (300) may be connected to a network (314) (e.g., a local area network (LAN), a wide area network (WAN) such as the Internet, or any other type of network) via a network interface connection (not shown). Those skilled in the art will appreciate that many different types of computer systems exist, and the aforementioned input and output means may take other forms. Generally speaking, the computer system (300) includes at least the minimal processing, input, and/or output means necessary to practice embodiments of the invention.

Further, those skilled in the art will appreciate that one or more elements of the aforementioned computer system (300) may be located at a remote location and connected to the other elements over a network. Further, embodiments of the invention may be implemented on a distributed system having a plurality of nodes, where each portion of the invention (e.g., update engine, web pages, data repository, etc.) may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for identifying obsolete discussion threads in a forum, comprising:
 extracting a plurality of keywords from a discussion thread, wherein the discussion thread comprises a plurality of postings posted by a plurality of users;
 assigning an initial keyword score to each of the plurality of keywords;
 identifying a change event, wherein the change event is a change affecting a topic of the forum;
 extracting a keyword from a recorded medium recording the change event, wherein the recorded medium is separate from the forum;
 comparing the keyword from the recorded medium with the plurality of keywords from the discussion thread to identify a matching keyword in the plurality of keywords;
 decreasing the initial keyword score of the matching keyword to a decreased score for the matching keyword based on the matching keyword matching the keyword from the recorded medium;
 aggregating the keyword score assigned to each of the plurality of keywords to obtain a total score for the discussion thread, wherein aggregating comprises using the reduced score for the matching keyword; and
 displaying a warning on a user interface comprising the discussion thread when the total score is below a first pre-specified threshold.

2. The method of claim 1, wherein the initial keyword score is initialized to a normalized score based on a number of the plurality of keywords.

3. The method of claim 1, wherein the initial keyword score of the matching keyword is decreased by subtracting a constant amount.

4. The method of claim 1, further comprising:
 removing the discussion thread when the total score is below a second pre-specified threshold.

5. The method of claim 1, further comprising:
 receiving a new post to the discussion thread;
 extracting a new keyword from the new post; and
 assigning a new keyword score to the new keyword.

6. The method of claim 5, wherein the new keyword score assigned to the new keyword is a normalized score based on a number of the plurality of keywords with the new keyword and the total score of the discussion thread.

7. The method of claim 1, wherein the change event comprises a statutory change.

8. The method of claim 1, wherein the change event comprises a release of a new version of a software product.

9. A computer system for identifying obsolete discussion threads in a forum comprising:
 a processor;
 a memory; and
 software instructions stored in the memory for causing the computer system to:
  extract a plurality of keywords from a discussion thread, wherein the discussion thread comprises a plurality of postings posted by a plurality of users;
  assign an initial keyword score to each of the plurality of keywords;
  identify a change event, wherein the change event is a change affecting a topic of the forum;
  extract a keyword from a recorded medium recording the change event, wherein the recorded medium is separate from the forum;
  compare the keyword from the recorded medium with the plurality of keywords from the discussion thread to identify a matching keyword in the plurality of keywords;
  decrease the initial keyword score of the matching keyword to a decreased score for the matching keyword based on the matching keyword matching the keyword from the recorded medium;
  aggregate the keyword score assigned to each of the plurality of keywords to obtain a total score for the discussion thread, wherein aggregating comprises using the reduced score for the matching keyword; and display a warning on a user interface comprising the discussion thread when the total score is below a first pre-specified threshold.

10. The computer system of claim 9, wherein the initial keyword score is initialized to a normalized score based on a number of the plurality of keywords.

11. The computer system of claim 9, wherein the initial keyword score of the matching keyword is decreased by subtracting a constant amount.

12. The computer system of claim 9, wherein the software instructions further cause the computer system to:
   remove the discussion thread when the total score is below a second pre-specified threshold.

13. The computer system of claim 9, wherein the software instructions further cause the computer system to:
   receive a new post to the discussion thread;
   extract a new keyword from the new post; and
   assign a new keyword score to the new keyword.

14. The computer system of claim 13, wherein the new keyword score assigned to the new keyword is a normalized score based on a number of the plurality of keywords with the new keyword and the total score of the discussion thread.

15. The computer system of claim 9, wherein the change event comprises a statutory change.

16. The computer system of claim 9, wherein the change event comprises a release of a new version of a software product.

17. A non-transitory computer readable storage medium comprising computer readable program code embodied therein for causing a computer system to:
   extract a plurality of keywords from a discussion thread in a forum, wherein the discussion thread comprises a plurality of postings posted by a plurality of users;
   assign an initial keyword score to each of the plurality of keywords;
   identify a change event, wherein the change event is a change affecting a topic of the forum;
   extract a keyword from a recorded medium recording the change event, wherein the recorded medium is separate from the forum;
   compare the keyword from the recorded medium with the plurality of keywords from the discussion thread to identify a matching keyword in the plurality of keywords;
   decrease the initial keyword score of the matching keyword to a decreased score for the matching keyword based on the matching keyword matching the keyword from the recorded medium;
   aggregate the keyword score assigned to each of the plurality of keywords to obtain a total score for the discussion thread, wherein aggregating comprises using the reduced score for the matching keyword; and
   display a warning on a user interface comprising the discussion thread when the total score is below a first pre-specified threshold.

18. The non-transitory computer readable storage medium of claim 17, wherein the initial keyword score is initialized to a normalized score based on a number of the plurality of keywords.

19. The non-transitory computer readable storage medium of claim 17, wherein the initial keyword score of the matching keyword is decreased by subtracting a constant amount.

20. The non-transitory computer readable storage medium of claim 17, wherein the computer readable program code further causes the computer system to:
   receive a new post to the discussion thread;
   extract a new keyword from the new post; and
   assign a new keyword score to the new keyword.

* * * * *